Patented Jan. 3, 1928.

1,655,388

UNITED STATES PATENT OFFICE.

FRANK J. GROTEN, JR., OF MERIDEN, CONNECTICUT, ASSIGNOR, BY MESNE ASSIGNMENTS, TO CONNECTICUT MOLDED PRODUCTS CORPORATION, OF MERIDEN, CONNECTICUT, A CORPORATION OF CONNECTICUT.

COMPOSITION AND PROCESS OF MANUFACTURE.

No Drawing. Application filed November 23, 1922. Serial No. 602,886.

My invention relates particularly to improvements on the invention of United States Letters Patent No. 1,346,397, of July 13th, 1920, and my Patent 1,517,360 dated December 2, 1924.

The main object is to provide a composition which can be more readily handled to produce more uniform results.

Another object is to improve the molding qualities of the composition so that there is less likelihood of injury to the dies and so that the molded pieces retain their shape better.

Another object is to increase the strength of the finished articles.

Another object is to improve the finish of the article.

In carrying out the invention, the following proportions by weight of the various preferred ingredients have been found satisfactory:

|  | Per cent |
|---|---|
| Asbestos-fibre | 40.1 |
| Slate-flour | 41.2 |
| Asphalt | 8.4 |
| Pure boiled linseed oil | 7.3 |
| East India copal chips | 2 |
| Pale crusher drier | 1 |

These ingredients are mixed at a temperature sufficiently high to assure fluidity of the asphalt and copal so that the mixture is intimate. The mixture when complete is in a fine powder form but something like fine moist sand. It is then cured or oxidized in an oven for several hours at a temperature of approximately 220° F. This temperature is not critical however as it may vary from 200 to 240° F. In fact the composition may be cured at even lower temperatures but a longer time is required at the lower temperatures. Above 240° F. there is a tendency to weaken or burn the composition and take the life out of it.

The material is then in condition to mold and its nature is such that it can be scraped or hoed into the molds without the necessity of weighing. This greatly increases the speed of production over processes which require weighing of the material. The material is compressed in the mold and then removed and baked for several hours. The baking is preferably accomplished in a series of steps, for instance, the articles may be first heated to a temperature of say 225° F. and then the temperature is raised somewhat and continued at the increased temperature for say an hour. This is kept up for several hours until a temperature of about 410° F. is reached and this temperature maintained for several hours more, say ten hours. The baking usually requires a total time of from 20 to 35 hours depending upon the size of the article. After baking the articles may be buffed or polished.

The use of slate-flour with the asbestos seems to not only materially increase the strength of the finished product, but the composition molds cleaner and truer, and the molded pieces may be extracted from the molds much easier and there is less tendency of the surfaces to bulge out of shape. The material flows readily into the molds and yet does not stick. I have also found that the curing can be accomplished in a shorter time when slate-flour is used.

The use of slate-flour seems to make it possible to obtain the necessary "condition" of the material for molding, in a shorter curing time without any tendency for the material to stick to the mold. This is a distinct advantage because the more incomplete the oxidation the better the material will flow causing less strain on the mold and requiring less pressure to mold the piece.

The percentages of the various ingredients can be varied considerably, but the advantages derived from the use of slate-flour are lessened as the proportion of slate-flour is decreased. I do not consider it advisable however to use more than 65% of slate-flour and not worth while to use much less than 30%. The asbestos should be preferably from 20 to 45% of the whole. Excellent results are obtained from the use of approximately equal parts of asbestos fibre and slate-flour. The asbestos and slate-flour together should preferably equal from about 72% to 84% of the total composition by weight.

Such a formula may be as follows:

| | Per cent |
|---|---|
| Slate flour | 64.2 |
| Asbestos | 21.2 |
| Asphalt | 6.5 |
| Linseed oil | 5.7 |
| Copal | 1.6 |
| Drier | .8 |

When too much slate-flour is used, a decrease in strength results in the finished product and it will crack when extracting from the mold. A proper proportion of slate-flour produces a plastic and easy flowing material which when compressed is easily extracted from the molds and the finished articles come out straight and true. I have also found that with the proper proportions of ingredients as herein set forth, it is unnecessary to lubricate the molds. The inserts may be assembled in the molds with this composition very readily. Various grades of slate-flour may be used, but where the devices are to be used for electrical purposes, it is desirable that the flour be free of carbon or iron. It should also of course be understood that the composition may be colored for such cases as require special coloring. The finished articles may be highly polished or buffed with much less labor than other compositions with which I am familiar.

I consider the practical limits of asphalt to be between five and ten per cent by weight and the best limits of the oil and drier together to be between four and ten per cent. The copal referred to is sometimes called a gum and sometimes a resin but I consider myself entitled to claim its substantial equivalents. The drier used is, as I understand, one form of a japan drier probably containing a manganese resinate together with a thinner.

The preferred oil is the usual commercial boiled linseed oil with a small percentage of a commercial drier, if desired.

The asphalt, copal, oil and drier may vary as set forth in my former Patent 1,517,360. When too much of the solids are used the finished article is likely to be too brittle. When too much of the liquid or plastic ingredients are used the composition is more difficult to handle and tends to swell and crack in the molds.

It is intended that the terms of the claims shall be interpreted to cover not only the ingredients specifically mentioned, but their substantial equivalents, as well known in the molded composition art.

I claim:

1. A cold moldable composition comprising a finely divided mixture of approximately equal parts of asbestos and slate flour totaling approximately 80 parts, approximately 8 parts of asphalt, approximately 8 parts of oxidized oil and drier, and approximately 2 parts of material such as copal.

2. A cold moldable composition comprising at least 30 and not more than 45 parts of asbestos, at least 25 and not more than 60 parts of slate flour, at least 6 parts and not more than 10 parts of asphalt, between 5 and 10 parts of oxidized oil and drier and approximately 3 parts of material such as copal.

3. A cold moldable composition comprising approximately equal parts of asbestos and slate flour totaling approximately 80 parts of the whole, approximately 8 parts of asphalt and approximately 10 parts of oxidized oil and material such as copal.

4. A cold molding composition comprising approximately 40% asbestos, approximately 41% slate flour, approximately 7% of an oxidized oil, approximately 1% of a drier, approximately 8% of asphalt and approximately 2% of copal.

5. A cold molding composition comprising between 20 and 45% asbestos, between 65 and 30% slate flour, between 4 and 10% of an oxidized oil, between 5 and 10% of asphalt, and less than 5% of material such as copal.

6. The method of forming a cold moldable composition which comprises mixing approximately 40 parts each of asbestos and slate flour with from 5 to 10 parts asphalt, from 10 to 4 parts of oxidized oil and drier, the oil predominating, and approximately two parts of a copal-like resin at a temperature sufficiently high to assure fluidity until the mixture is intimate, then curing the mixture for several hours at a temperature of approximately 220° F. to form a powder.

7. The method of forming a cold moldable composition which comprises mixing approximately eighty percent of inert material consisting of asbestos fibre and slate flour, and approximately twenty percent of materials which are fluid at temperatures of approximately 200° F. such later materials consisting of asphalt, a drying oil of the linseed oil type and resin of the copal type and curing the mixture to form a powder.

8. The process of forming a composition from which molded articles may be made which comprises mixing approximately 40 parts asbestos, approximately 40 parts slate-flour, approximately 8 parts asphalt, approximately 10 parts of an oxidizing oil and copal to produce a fine powder, curing the powder at a temperature of approximately 200 to 250° F., then molding the powder under pressure.

9. The process of forming a composition from which molded articles may be made which comprises mixing approximately 40% of asbestos with approximately 41% of slate-flour, approximately 8% of asphalt, approximately 7% of linseed oil and some copal, curing the mixture at an elevated temperature for some hours.

10. The process of forming a composition from which molded articles may be made which comprises mixing asbestos, slate-flour, asphalt and an oxidizable oil in substantially the proportions set forth in the description to form a powder, curing this powder for several hours at a temperature of approximately 220° F.

FRANK J. GROTEN, Jr.